April 24, 1956

L. W. PARKER 2,743,375

TURBO-GENERATOR

Filed Sept. 18, 1953

INVENTOR
LOUIS W. PARKER

BY: *Moore & Hall*

ATTORNEYS

United States Patent Office 2,743,375
Patented Apr. 24, 1956

2,743,375

TURBO-GENERATOR

Louis W. Parker, Great Neck, N. Y.

Application September 18, 1953, Serial No. 380,996

5 Claims. (Cl. 290—52)

This application contains common disclosure with my abandoned application filed September 19, 1950, Serial No. 185,570.

The present invention relates to turbo-generators of the type which combines a vapor-driven turbine with an electrical generator in a unitary structure. It is designed to employ standard types of turbine construction, which utilize a series of rotary rings or vanes mounted on a shaft and arranged in alternation with a series of stationary rings provided with vapor passages and mounted on the casing. The space between the rings and shaft has hitherto been used only for supporting and partitioning elements.

The general purpose of this invention is to utilize this space for an electrical generator driven by the turbine; the turbine being placed on the outside to take advantage of a higher peripheral speed. However, this arrangement presents serious problems. The standard type of generator is too bulky to fit into the space, and its construction and arrangement make such a location impracticable.

These problems are solved by the present invention, which combines a turbine construction with a generator of the type disclosed in the present inventor's United States Patent No. 2,479,589. This generator comprises a series of alternating stationary and rotating disks, the latter mounted on a shaft and the former on a casing, the disks carrying cooperating flat radial pole-pieces and windings. According to the present invention, by mounting the rotating turbine blades on the peripheries of the rotating disks, and arranging the stationary ring structures of the turbine at the outer peripheries of the stationary disks, the type of generator construction disclosed in said patent can be combined with a turbine construction of standard type to form a compact unit which retains the mechanical efficiency of the turbine and the electrical efficiency of the generator, since the invention does not require substantial modification of either element in order to combine them. Generators can be designed in accordance with the above patent which will be from one-fifth to one-tenth of the size of conventional generators, which makes it practical to house a generator of adequate capacity in the limited space between the turbine blades and the shaft.

A feature of the invention is the improved thermal efficiency which is obtained from the combination. In ordinary electrical generators energy is lost by the radiation of heat. In a turbo-generator embodying this invention the heat from the generator is transmitted to the turbine surrounding the generator, where it is transformed into mechanical energy by raising the vapor temperature, thereby reducing condensation and increasing the turbine power. Conversely, the vapor serves to cool the generator and prevents overheating. The generator can readily be constructed to operate at a temperature which will be maintained by the cooling effect of the vapor, permitting heavier electrical overloads without damage. The windings can be protected by insulation that will withstand such temperature; for instance, the wire can be insulated with materials now on the market such as ceramics, that are not affected by temperatures up to at least 250° C., whereas saturated steam at 150 pounds pressure has a temperature of only about 180° C. The indicated improvement in thermal efficiency is therefore entirely practical. Turbines are often operated by exhaust steam having a temperature of the order of 100° C. In such cases the heat supplied to the turbine by the generator may be substantial, and the increased power obtainable from the generator due to the cooling effect of the steam will be very considerable.

The efficiency may be further increased by utilizing as the source of the driving vapor a liquid having a boiling point substantially below that of water. Carbon tetrachloride, also silicon tetrachloride, is a suitable liquid for this purpose, and others are known. The vapor from such a liquid will be substantially cooler for any given pressure than steam, permitting the use of higher turbine pressures, lower generator operating temperatures, or both. Such an arrangement permits much heavier loading of the generator, due to the greater cooling effect of the vapor. Among the advantages of carbon tetrachloride may be mentioned (1) the fact that its vapor may be produced by hot water used as a source of, or transfer medium for, heat; and (2) the fact that it provides lubrication of moving parts may replace other lubricants.

The use of carbon tetrachloride or other such working substance in a turbo-generator embodying the above indicated arrangement in which the turbine structure surrounds the generator structure is a feature of the invention.

The indicated arrangement also has certain mechanical advantages. In ordinary turbines, generators and turbo-generators the shaft is subjected to substantial torque and must be correspondingly heavy and rigid. In the present invention the torque between the driving turbine blades and the driven generator poles is transmitted by the disk structure, and furthermore is divided among a plurality of discs. Consequently, a shaft of relatively small diameter may be used, and this in turn affords a reduction in the peripheral speed of the shaft at the bearing surfaces. Moreover, in the preferred form the shaft is vertical, with the vapor entering at the bottom of the unit and traveling upward, so that the weight of the rotor is lifted by the vapor pressure, further reducing the load on the shaft and bearings. These features are particularly advantageous when the turbo-generator is designed to run at high speed, such as 10,000 R. P. M. and over.

An important advantage of the invention is the fact that it facilitates the construction of a turbo-generator that is much more compact and lighter in weight for a given output than is possible with previous arrangements. This is frequently of prime importance, for instance in installations on ships. Another advantage is that it permits construction of a hermetically sealed generator unit, requiring the minimum of service.

Another feature of the invention is the use of a housing which encloses the machine completely and thereby avoids all leakage of fluid therefrom. Ordinarily a shaft is brought out from a turbine or pump for the purpose of transmitting mechanical power, and this involves the use of shaft bearings which present a leakage problem.

While the invention has so far been set forth only in its application to turbo-generators, in which it is particularly advantageous, it is also applicable to motor-driven fans or blowers, using the same general arrangement as that described above, but with the electrical part operating as a motor and the peripheral blades on the rotor disk functioning as fans or blowers. In fact, a turbo-generator can be used in this manner to propel gases without change in construction, though its efficiency will of course be very much increased by redesign. The invention in its broadest aspect therefore includes such blower design and operation.

Other objects and advantages will appear from the following description in conjunction with the accompanying drawing, in which.

Various types of turbine construction can be used with the invention, as already indicated. In the illustrated embodiment the Rateau type has been selected, partly because it facilitates a simpler and clearer showing than some other types. In the Rateau turbine, as described for instance in "Steam Turbines" by Walter S. Leland, published by American Technical Society in 1918, the expansion of the vapor as it passes from inlet to outlet is accommodated by restricting the extent of the passages through the stationary rings adjacent to the inlet to spaced arcuate sections, and gradually increasing the angular length of the arcuate sections in succeeding stationary rings.

Figure 2:
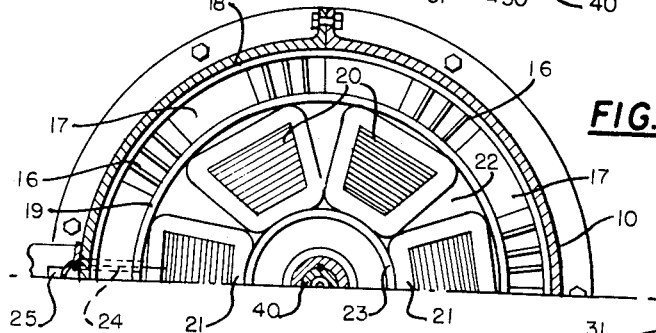
Fig. 2 is a partial transverse section on line 2—2 of Fig. 1, showing one half of a stator disk.

The illustrated embodiments include a cylindrical casing 10 mounted on a base 11 and having a vapor inlet 12 and a vapor outlet 13. Stator disks 14 are mounted in spaced annular recessed seats 15 in the inner face of casing 10. Each stator disk 14 comprises an outer turbine section carrying nozzles, passages or vanes for the vapor, and an inner generator (or motor) section which carries stator poles. In the form shown the turbine section includes passages formed by vanes 16 (Fig. 2) and spacing plates 17 mounted between an outer rim 18 which fits into a groove 15, and a connecting rim 19. The generator section is constructed as described in said Patent No. 2,479,589 and particularly shown in Figs. 5 and 6 thereof. It includes laminated pole pieces 20 and windings 21 held in place by a flat solid matrix 22 molded between and engaging connecting rim 19 and inner rim 23. A suitable conduit 24 for winding connections may be formed in the spacing plate 17 connecting with a suitable terminal block 25 on the outside of casing 10.

Figure 1:
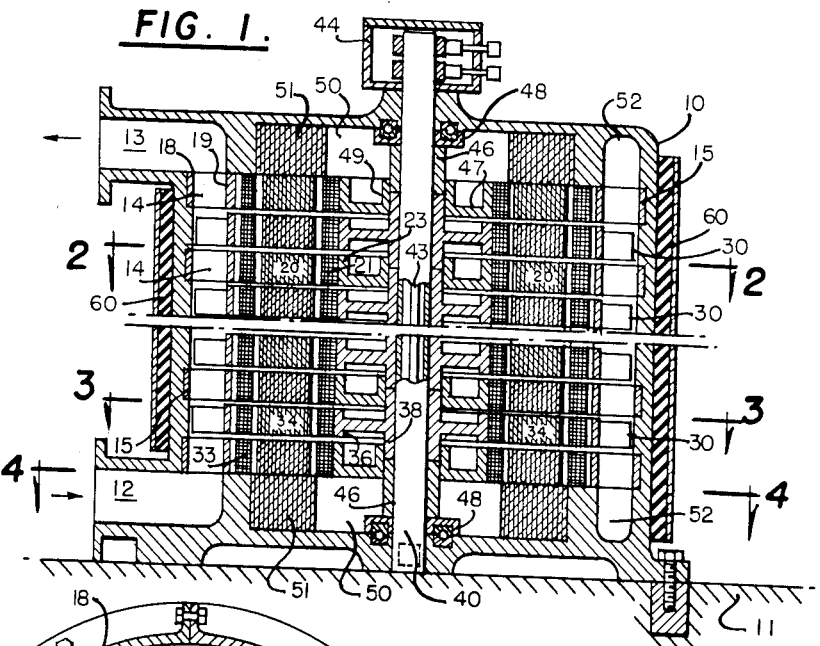
Fig. 1 is a central vertical section through a turbo-generator embodying the invention.
Figure 3:
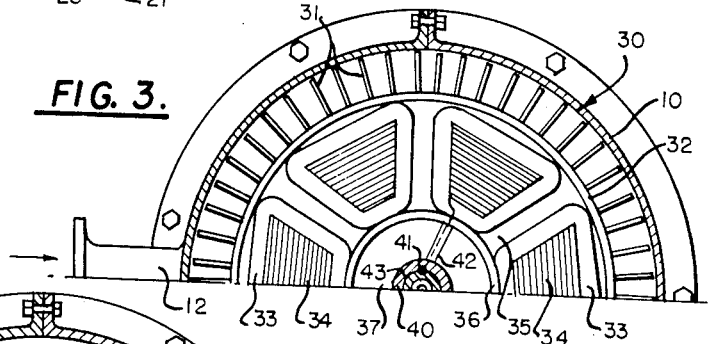
Fig. 3 is a partial transverse section on line 3—3 of Fig. 1, showing one half of a rotor disk.

Between each pair of stator disks 14 is located a rotor disk 30 (Figs. 1 and 3), which likewise comprises an outer turbine section and an inner generator section. The turbine section includes an annular series of turbine blades or vanes 31 arranged in axial alignment with stator vanes 16 and mounted on connecting rim 32. The rotor generator section is substantially the same as the stator generator section, including windings 33 around laminated pole pieces 34 held in place by a plastic matrix 35 which engages outer rim 32 and inner rim 36. The latter is connected by web 37 with cylindrical hub 38 fitting on shaft 40 and fixed thereto, as by key 41. A conduit 42 for leads from the windings may be formed in web 37 leading through hub 38 to passage 43 running lengthwise through hollow shaft 40 and connecting with a suitable slip ring or other connecting arrangement in terminal box 44 mounted on casing 10 at the upper end of shaft 40.

Hubs 38 of the rotor disks preferably abut each other, the end hubs engaging spacer sleeves 46 bearing against thrust bearings 48 for shaft 40 carried by casing 10. Each inner ring 23 of a stator disk is provided with an annular web 47 carrying an anti-friction metal collar 49 having a running fit with the registering rotor disk hub 38, arranged to prevent leakage of the vapor.

Figure 4:
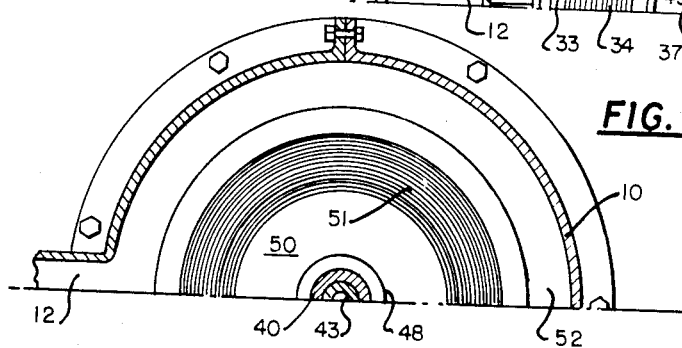
Fig. 4 is a partial transverse section on line 4—4 of Fig. 1, showing one half of an end portion.

Each end of casing 10 is provided with a recess 50 (Figs. 1 and 4) in which is mounted an annular laminated end pole piece 51 in axial register with the stator and rotor poles 20 and 34. Each end also includes an annular passage 52 for the vapor, connected to inlet 12 or outlet 13 respectively, and in register with vanes 16 and 31 of the stator and rotor disks 14 and 30.

Many details of the generator sections have been omitted, since they are set forth in the above-mentioned patent. All of the pole pieces are made of laminations having substantially lower reluctance in one direction, called the flux axis. All of the pole pieces 20 and 34 are arranged with their flux axes parallel to the shaft, so that they provide minimum reluctance in the magnetic paths of the generator between the end poles 51. The latter, each of which is advantageously formed of a spirally wound metal strip having a lengthwise flux axis, have minimum reluctance in a circumferential direction, which constitutes the major portion of the magnetic path between adjacent poles 20 of the end stator disks 14. The end poles 51 are made sufficiently deep to facilitate the bending of the flux in the latter path without introducing undue reluctance. The arrangement of the various poles increases materially the magnetic efficiency of the generator.

In operation as a turbo-generator, vapor at relatively high temperature enters inlet 12 and passes through the turbine sections of successive stator and rotor disks precisely as in the ordinary turbine, escaping through outlet 13. The rotor disks revolve at high speed, and the generated current may be taken off at outlet box 44. When operating as a motor driven fan, blower, or pump, current is applied at box 44, terminal block 25 or both, depending on the motor circuit, thereby revolving the rotor disks. For this method of operation the direction of flow of propelled fluid is made opposite to that of the propelling fluid used in a turbo-generator, namely downward, entering at 13 and leaving at 12, in order to exert the preferred lifting force on the rotor.

If desired, an insulating jacket 60 may be applied to the exterior of the machine to reduce the loss of heat therefrom to the surrounding air.

Many constructional details which will be obvious to those skilled in this art have been omitted or have not been described. Likewise it will be apparent that many variations and alternative constructions are practicable without departing from the invention. In particular, a feature of the invention is to combine a flat disk type motor or generator structure with a peripheral turbine structure in such a way that a wide variety of turbine types can be utilized by appropriate design of the turbine sections and casing. Further, while many turbines have rotor disks varying in diameter, and such arrangements can be used with this invention, the nature of this type of modification is so obvious that no illustration of it is deemed necessary. Known auxiliary devices, such as governors, may also be used, but are not shown, as they form no part of the invention.

When the apparatus is to be used as a blower, the vane sections will likewise be appropriately designed for this purpose without affecting the disclosed arrangement of parts and general relationships. Further, the generator sections can be designed in obvious manner for operation with single or multiple phase lines and with different types of circuits, such as the squirrel-cage circuit disclosed in said patent. It is pointed out that the invention is especially suitable for the generation of relatively high frequencies, which of course can be changed in frequency or rectified to produce direct current in standard manner.

It has been pointed out that this invention relates equally to electric generators and motors, and that it relates equally to fluid-propelled motors (turbines) and fluid-propelling machines (pumps or blowers). In the claims the generic term "dynamo-electric machine" is used to designate either an electric generator or an electric motor; likewise the generic term "fluid-dynamic machine" is used to designate either a turbine or a blower (or pump). For convenience and brevity, the specific term "turbo-generator" is used as the title to this application, but it is not intended thereby to limit the scope of the claims to this specific form of machine.

In the description of the invention and in the claims the term "vapor" has been used in its broadest sense to include steam, other gases produced by vaporization of liquids, and gases not thus produced but useful in fluid-dynamic machines. Moreover, the term "fluid" is used in its broadest sense to include both liquid and vapor. In this connection it should be noted that, by proper design of the elements in the fluid path, liquids such as water can be used as the propelling fluid or propelled fluid.

I claim:

1. In combination, a dynamo-electric machine having a set of rotor sections arranged in alternation with a set of stator sections, and a fluid-dynamic machine having a set of rotor sections arranged in alternation with a set of stator sections, each rotor section of the dynamo-electric machine being secured to a corresponding rotor section of the fluid-dynamic machine for transfer of mechanical power, and each stator section of the dynamo-electric machine being secured to a corresponding stator section of the fluid-dynamic machine for mechanical support; said sets of stator sections having spaced arcuate sections of progressively changing angular length for the passage therethrough of fluid with progressively changing volume; all of the rotor and stator sections of the dynamo-electric machine being of substantially equal diameters and all rotor and stator sections of the fluid dynamic machine being of substantially equal diameters, the rotor sections of the dynamo-electric machine being secured to a common support and the stator sections of the dynamo-electric machine extending continuously to within close proximity to said common support, to form partitions which prevent substantial flow of fluid between rotor sections bypassing stator sections.

2. The combination of claim 1 wherein said dynamo-electric machine secured to said fluid-dynamic machine comprises a composite substantially cylindrical structure concentric with respect to said common support, the rotor and stator sections of said fluid-dynamic machine being disposed adjacent the periphery of said composite structure, and the rotor and stator sections of said dynamo-electric machine being disposed adjacent the center of said composite structure, a fluid inlet adjacent the periphery of said composite structure, a fluid outlet adjacent the periphery of said composite structure, so that fluid passing from said inlet to said outlet passes through said fluid-dynamic machine adjacent the periphery of said composite structure, whereby heat generated during operation of said dynamo-electric machine passes in directions radial to said common support via said fluid dynamic machine from the center of said composite structure to said peripherally disposed fluid.

3. The combination of claim 1 wherein said secured sets of dynamo-electric machine rotors and fluid-dynamic machine rotors comprise a first set of disk-like structures having said fluid-dynamic machine rotors adjacent the peripheries thereof and said dynamo-electric machine rotors adjacent the centers thereof, said secured sets of dynamo-electric machine stators and fluid-dynamic machine stators comprising a second set of disk-like structures having said fluid dynamic machine stators adjacent the peripheries thereof and said dynamo-electric machine stators adjacent the centers thereof, said first and second sets of disk-like structures being disposed substantially parallel to one another in alternating relationship thereby to effect a substantially cylindrical stack of disk-like structures, said common support comprising an elongated shaft disposed substantially transverse to said disk-like structures adjacent the centers of said disk-like structures.

4. The combination of claim 3 including fluid inlet means adjacent one end of said cylindrical stack of disk-like structures, and fluid outlet means adjacent the other end of said cylindrical stack of disk-like structures whereby fluid flows from said inlet means to said outlet means via said fluid-dynamic machine adjacent the peripheries of said disk-like structures.

5. In combination, a dynamo-electric machine comprising a set of rotor sections and a set of stator sections, and a fluid-dynamic machine comprising a set of rotor sections and a set of stator sections, each rotor section of said dynamo-electric machine being attached to a corresponding rotor section of said fluid-dynamic machine for transfer of mechanical power, said attached sets of rotor sections comprising first disk-like structures disposed substantially parallel to one another with each such first disk-like structure comprising a fluid-dynamic machine rotor adjacent the periphery thereof and a dynamo-electric machine rotor adjacent the center thereof, each stator section of said dynamo-electric machine being secured to a corresponding stator section of said fluid-dynamic machine for mechanical support, said attached sets of stator sections comprising second disk-like structures disposed substantially parallel to one another with each such second disk-like structure comprising a fluid-dynamic machine stator adjacent the periphery thereof and a dynamo-electric machine stator adjacent the center thereof, said first and second disk-like structures being alternately disposed with respect to one another in substantially parallel relationship, an elongated shaft substantially transverse to said disk-like structures and secured to said first disk-like structures adjacent the center of said first structures, said second disk-like structures extending continuously to within close proximity of said shaft, and fluid inlet means adjacent the periphery of said disk-like structures for effecting fluid flow through said fluid-dynamic machine adjacent the peripheries of said first and second disk-like structures whereby heat generated by operation of said dynamo-electric machine flows radially outward from said dynamo-electric machine to said peripherally flowing fluid in said fluid-dynamic machine.

References Cited in the file of this patent

UNITED STATES PATENTS

| Number | Name | Date |
|---|---|---|
| 452,546 | Mitchell | May 19, 1891 |
| 574,562 | Nash | Jan. 5, 1897 |
| 748,215 | Porter et al. | Dec. 29, 1903 |
| 754,400 | Westinghouse | Mar. 8, 1904 |
| 958,681 | Schulz | May 17, 1910 |
| 1,025,021 | Schulz et al. | Apr. 30, 1912 |
| 1,269,209 | Olson | June 11, 1918 |
| 2,031,968 | Mathias | Feb. 25, 1936 |
| 2,106,557 | Putnam | Jan. 25, 1938 |
| 2,231,620 | Goldenberg | Feb. 11, 1941 |
| 2,479,589 | Parker | Aug. 23, 1949 |
| 2,495,745 | Litton | Jan. 31, 1950 |

FOREIGN PATENTS

| 509,726 | Great Britain | July 20, 1939 |